US006703796B2

(12) United States Patent
Che-Chen et al.

(10) Patent No.: US 6,703,796 B2
(45) Date of Patent: Mar. 9, 2004

(54) POWER SUPPLY AND INVERTER USED THEREFOR

(75) Inventors: Fan Chiang Che-Chen, Hsinchu (TW); Yi-Chao Chiang, Hsinchu (TW)

(73) Assignee: Ambit Microsystems Corp., Hsinchu (TW)

( * ) Notice: Subject to any disclaimer, the term of this patent is extended or adjusted under 35 U.S.C. 154(b) by 0 days.

(21) Appl. No.: 10/057,083

(22) Filed: Jan. 25, 2002

(65) Prior Publication Data

US 2003/0090913 A1 May 15, 2003

(30) Foreign Application Priority Data

Nov. 9, 2001 (TW) ...................................... 90127902 A

(51) Int. Cl.[7] .............................. G05F 1/00; H02J 7/04; H02J 1/00

(52) U.S. Cl. ....................... 315/291; 315/307; 315/311; 315/274; 320/150; 320/140; 363/15; 363/34

(58) Field of Search ................................ 315/291, 307, 315/311, 274, 276, 183, 200 R, 224, 216, 272; 320/150, 140; 363/15, 34

(56) References Cited

U.S. PATENT DOCUMENTS 5,428,267 A * 6/1995 Peil ............................ 315/224
5,854,617 A * 12/1998 Lee et al. .................. 345/102
5,900,717 A * 5/1999 Lee ............................ 320/150
6,075,345 A * 6/2000 Lee ............................ 320/138
6,160,361 A * 12/2000 Giannopoulos et al. ..... 315/307
6,225,708 B1 * 5/2001 Furukawa et al. ............ 307/66
6,255,744 B1 * 7/2001 Shih et al. .................... 307/66

* cited by examiner

*Primary Examiner*—Tuyet T. Vo
(74) *Attorney, Agent, or Firm*—Ladas & Parry

(57) ABSTRACT

This invention relates to a power supply that integrates a rectifier/filter's circuitry and a converter's circuitry with an inverter to reduce space occupied and increase power efficiency. The power supply includes: a rectifier/filter, a DC-DC converter and a DC-AC inverter. The rectifier/filter, connected to an alternating current (AC) input terminal, converts the input AC into a direct current (DC). The DC-DC converter and the DC-AC inverter are parallel to each other with one end concurrently connected to the rectifier/filter's output and the other end respectively outputting the desired powers. As such, DC-DC converter reduces the converted DC voltage to lower DC voltages to power all circuits except for the lamp and DC-AC inverter converts the converted DC voltage into higher AC voltage output to drive the lamp.

26 Claims, 7 Drawing Sheets

POWER SUPPLY AND INVERTER USED THEREFOR

BACKGROUND OF THE INVENTION

1. Field of the Invention

This invention relates to a power supply system, and particularly to a structure suitable for multiple ranges of input voltage, which integrates a rectifier/filter's circuitry and a converter's circuitry with an inverter to reduce volume and increase power efficiency.

2. Description of the Related Art

Household power supply typically ranges from 90–132 Vac and 180–264 Vac. However, in current LCD monitors, a DC source with lower voltage than the power supply is used to power all circuits, e.g. the video control circuit, except that the discharge lamp for illumination is powered by an AC source with higher voltage than the power supply. For example, a mono-lamp notebook requires about 7–21 Vdc while a multi-lamp LCD monitor requires the rated voltage about 12 or 15 Vdc. Also, the monitor requires more than 1000 Vac to drive a cold cathode fluorescent lamp (CCFL) for illumination. Therefore, to meet the above requirements, a typical power supply system, as shown in FIG. 1, must include an AC source input from a socket passing through a rectifier/filter 11, a fly-back converter 12, a DC-AC inverter 13 and a buck regulator 14 to provide the lamp(s) with AC power and other elements of the display system with DC power. As such, the typical power supply system must convert between AC and DC in too many stages, which causes inconvenience and inefficiency. In current products, the rectifier/filter 11 and the fly-back converter 12 are combined together to form an additional adapter 10, which is further connected to the inverter 13 and the buck regulator 14 via additional connectors and cables (not shown). Accordingly, such a product carries power efficiency only to about 70%, high production costs and larger dimensions.

SUMMARY OF THE INVENTION

Therefore, an object of the invention is to provide a power supply with reduced dimensions and increased power efficiency without the need of an additional adapter. The power supply for powering a system having a lamp includes a rectifier/filter, a DC-DC converter and a DC-AC inverter. The rectifier/filter has an input terminal for inputting AC voltage in order to convert the input AC voltage into DC voltage. The DC-DC converter and DC-AC inverter are parallel to each other with one end concurrently connected to the rectifier/filter's output and the other end respectively outputting the power required by the system. As such, DC-DC converter reduces the converted DC voltage to the lower DC voltages to power all circuits except for the lamp, and DC-AC inverter converts the converted DC voltage to a higher AC voltage output to drive the lamp.

Accordingly, the inventive power supply can directly integrate the rectifier/filter, converter and inverter to increase power efficiency. Moreover, components with lower rated power can be used and the power supply can be arranged on a single circuit board. Therefore, the volume is reduced and the component cost and assembling cost are both lowered.

A further object of the invention is to provide an inverter for driving a discharge lamp, the inverter including: two switches, a driver for driving the two switches alternately turned on, a transformer, a sampling circuit for obtaining the current value through the lamp and outputting a feedback signal, a PWM control circuit for controlling the duty cycle of the driver according to the feedback signal, a voltage detection circuit for outputting a control signal according to the DC voltage received by the inverter, and an impedance adjustment circuit for adjusting the equivalent impedance value of the inverter according to the control signal.

Accordingly, the inventive inverter can change the frequency-to-impedance curves through the impedance adjustment circuit's adjustment when the input voltage is higher. Therefore, the operating frequency of the inverter will not change remarkably with the increasing input voltage. The invention thus ensures a longer lifespan of the lamp and avoids the temperature-increasing problem due to the skin effect on the wires during high-frequency operation to thereby reduce the converting loss.

BRIEF DESCRIPTION OF THE DRAWINGS

The invention will be apparent by referring to the following detailed description of a preferred embodiment with reference to Accompanying drawings, wherein.

DETAILED DESCRIPTION OF THE INVENTION

Figure 1:
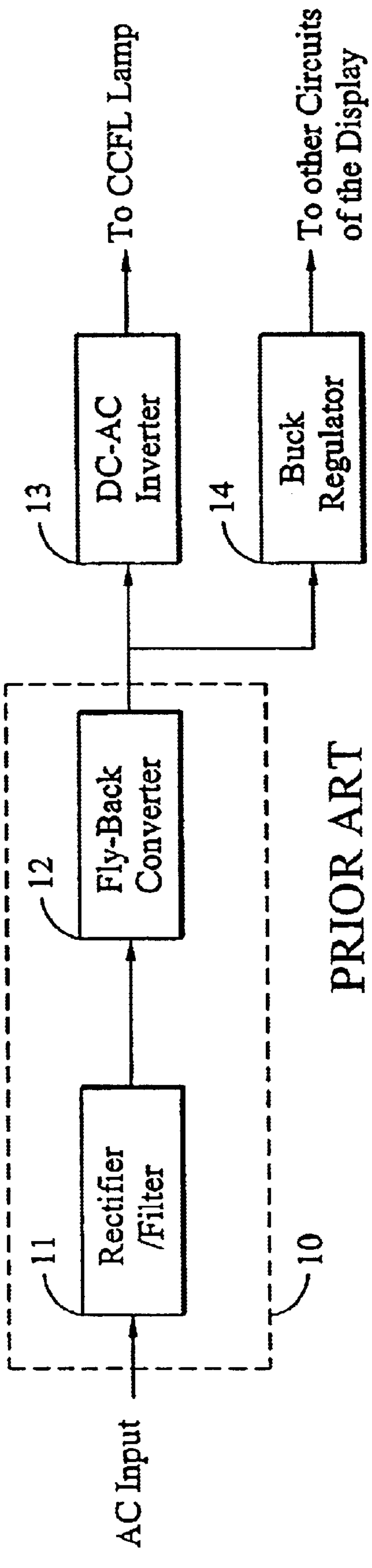
PRIOR ART FIG. 1
FIG. 1 shows a block diagram of a typical power supply system.

The following similar function elements are denoted by the same reference numerals.

Figure 2:
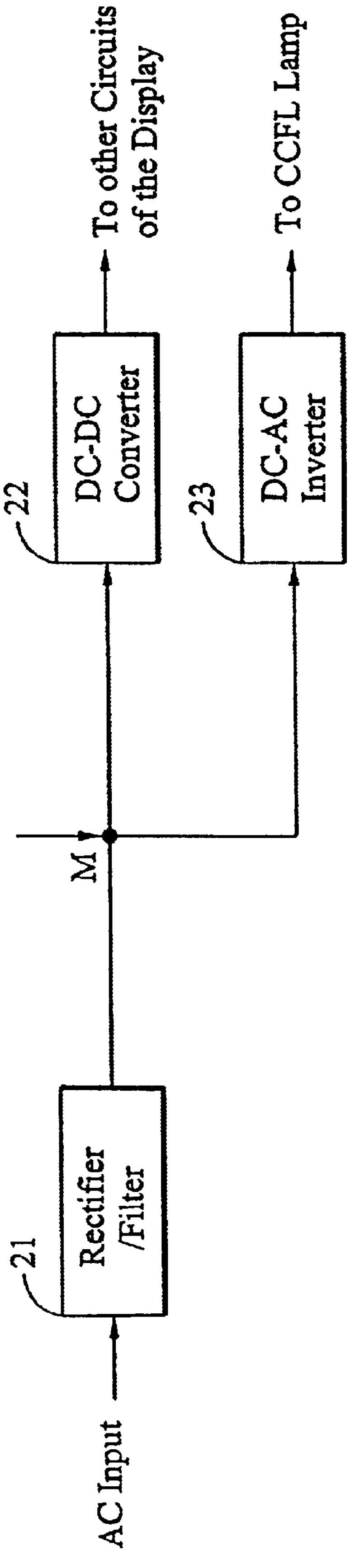
FIG. 2 shows a block diagram of an inventive power supply system.

FIG. 2 is a block diagram of an inventive power supply system. In FIG. 2, the power supply includes: a rectifier/filter 21, a DC-DC converter 22 and a DC-AC inverter 23. As shown in FIG. 2, the rectifier/filter 21 has an input terminal connected to an alternating current (AC) source for converting the input AC voltage (generally, household power is 90–132 Vac or 180–264 Vac) into the direct current (DC) voltage to be output (e.g., the voltage at the node M is 120–190 Vdc or 250–380 Vdc). The DC-DC converter 22 and the DC-AC inverter 23, other than a typical three-stage power supply system, are connected in parallel and have one end concurrently connected to the rectifier/filter's output so as to reduce the number of stages from the input AC voltage to the desired output voltage and raise the power efficiency up to 80%. It means that, with respect to power efficiency, the inventive configuration is about 10% higher than normal. In such a configuration, the DC-DC converter 22 reduces DC voltage output generated by the rectifier/filter 21 to the lower DC voltage to power all circuits except for the lamp. The DC-AC inverter 23 converts DC voltage output into a higher AC voltage output to drive the lamp. For example, the converter 22 provides a 12 Vdc and/or a 5 Vdc to the circuits of an LCD, or even to a PC. As well, the inverter 23 provides the AC driving voltage to a CCFL with more than 1000 Vac. The inverter is described in detail as follows.

Figure 3:
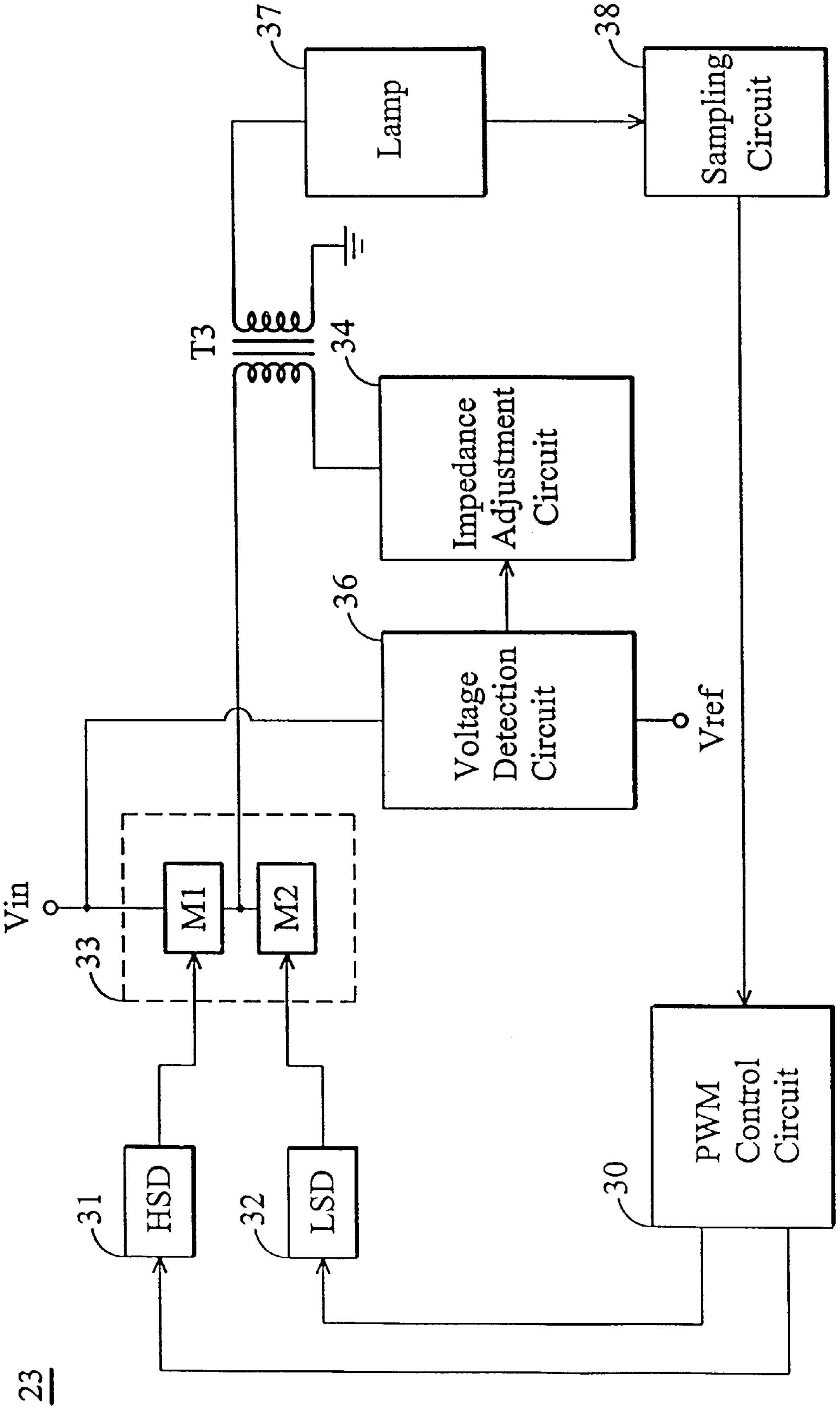
FIG. 3 shows a block diagram of an inverter in FIG. 2 according to the invention.

FIG. 3 shows a block diagram of the inverter 23 in FIG. 2. In FIG. 3, the inverter 23 applied to drive the lamp 37 includes: switches 33 (including a first switch M1 and a second switch M2), a high side driver (HSD) 31, a low side driver (LSD) 32, a transformer T3, an impedance adjustment circuit 34, a voltage detection circuit 36, a sampling circuit 38 and a pulse width modulation (PWM) control circuit 30.

As shown in FIG. 3, the HSD 31 and the LSD 32 are respectively coupled to the control input of the first switch M1 and the second switch M2 so as to drive the two switches M1, M2 to be alternately turned on with a driving frequency. Therefore, DC voltage (i.e., DC voltage fed into the node M of FIG. 2) from the input terminal Vin is converted by switching between the switches M1, M2 into a square-wave AC to feed into the primary side of the transform T3. The transformer T3 steps up and filters the square-wave AC to output a sine-wave AC with about more than 1000 V in order to drive the lamp 37 coupled to the secondary side of the transformer T3. The sampling circuit 38 is coupled to one end of the lamp 37 to detect the current through the lamp 37 and output a feedback signal to the PWM control circuit 30. The PWM control circuit 30 controls the duty cycles of the HSD 31 and the LSD 32 according to the feedback signal so as to regulate the brightness of the lamp 37. The impedance adjustment circuit 34 is coupled between the primary side of the transformer T3 and the voltage detection circuit 36. The voltage detection circuit 36 compares DC voltage Vin input to the inverter 23 with a predetermined reference voltage Vref and controls the impedance switching of the impedance adjustment circuit 34 based on the comparison result. As such, the impedance value of the impedance adjustment circuit 34 is changed and the equivalent impedance value observed at the primary side of the transformer T3 is changed.

The PWM control circuit 30 in FIG. 3 can also be replaced by, for example, a frequency modulation control circuit, which controls the switching frequency of the HSD 31 and the LSD 32 according to the feedback signal to reach the goal of the lamp brightness adjustment.

Figure 4:
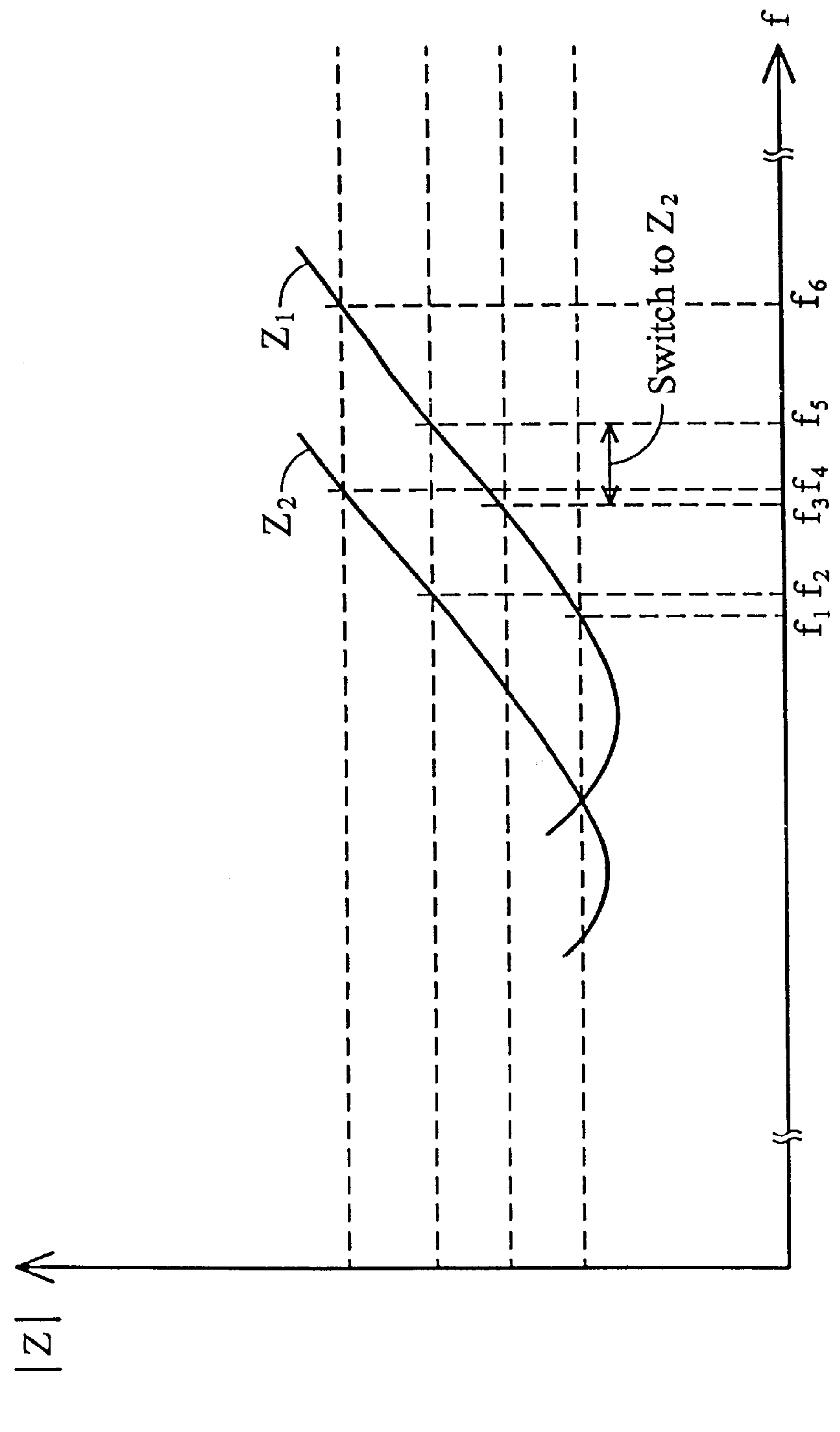
FIG. 4 shows two impedance-frequency curves illustrating the impedance switching of the impedance adjustment circuit in FIG. 3.

FIG. 4 shows two impedance-frequency curves illustrating the impedance switching of the impedance adjustment circuit in FIG. 3. As shown in FIG. 4, as the power supply shown in FIG. 2 has an input power Vin from 90 to 132 Vac, DC voltage 120–190 Vdc converted from the input Vin is detected by the voltage detection circuit 36. At this point, the impedance adjustment circuit 34 is controlled so that the inverter 23 is operated at the impedance $Z_1$. As such, the operating frequency ranges between f1 and f3, wherein f1 responds to the 120 Vdc input voltage and f3 responds to the 190 Vdc input voltage. As the power supply shown in FIG. 2 has an input power Vin from 180 to 264 Vac, DC voltage 250–380 Vdc converted from the input Vin is detected by the voltage detection circuit 36. At this point, the impedance adjustment circuit 34 is controlled so that the inverter 23 is operated at the impedance $Z_2$. As such, the operating frequency ranges between f2 and f4, wherein f2 responds to the 250 Vdc input voltage and f4 responds to the 380 Vdc input voltage. Accordingly, the inventive operation ranges between f1 and f4, which in practice ranges between about 50 kHz and about 65 kHz. Contrarily, the conventional inverter is not provided with voltage detection circuit 36 and the impedance adjustment circuit 34 and thus has no impedance switching function. In such case, when the power supply has an input power Vin from 180 to 264 Vac, the operating frequency is ranged between f5 and f6, wherein f5 responds to the 250 Vdc input voltage and f6 responds to the 380 Vdc input voltage. As such, obviously, when the input voltage is higher, the inverter may be operated at high frequency (about 80 kHz), the operating frequency range is more varied and thus easily causes skin effect. The problem can be solved with the use of the inventive inverter, which can switch the impedance-frequency curve from $Z_1$ to $Z_2$ when the input voltage is higher, to operate in a relatively narrow operating frequency range, thereby reducing the skin effect. In addition, due to the narrow frequency variation, the life of the lamp is prolonged. Moreover, because the switching frequency of the switch 33 is lowered, the entire circuit is reduced in temperature and further reduced in power loss so as to increase efficiency. In the above description, the input voltage range 120–380 Vdc is only used for illustration and is not intended to be limiting. Those familiar with the prior art can change the input voltage range according to needs. Further, the voltage detection circuit 36 may be modified to detect the external AC input voltage in FIG. 2 and accordingly output a control signal to the impedance adjustment circuit 34.

Figure 5:
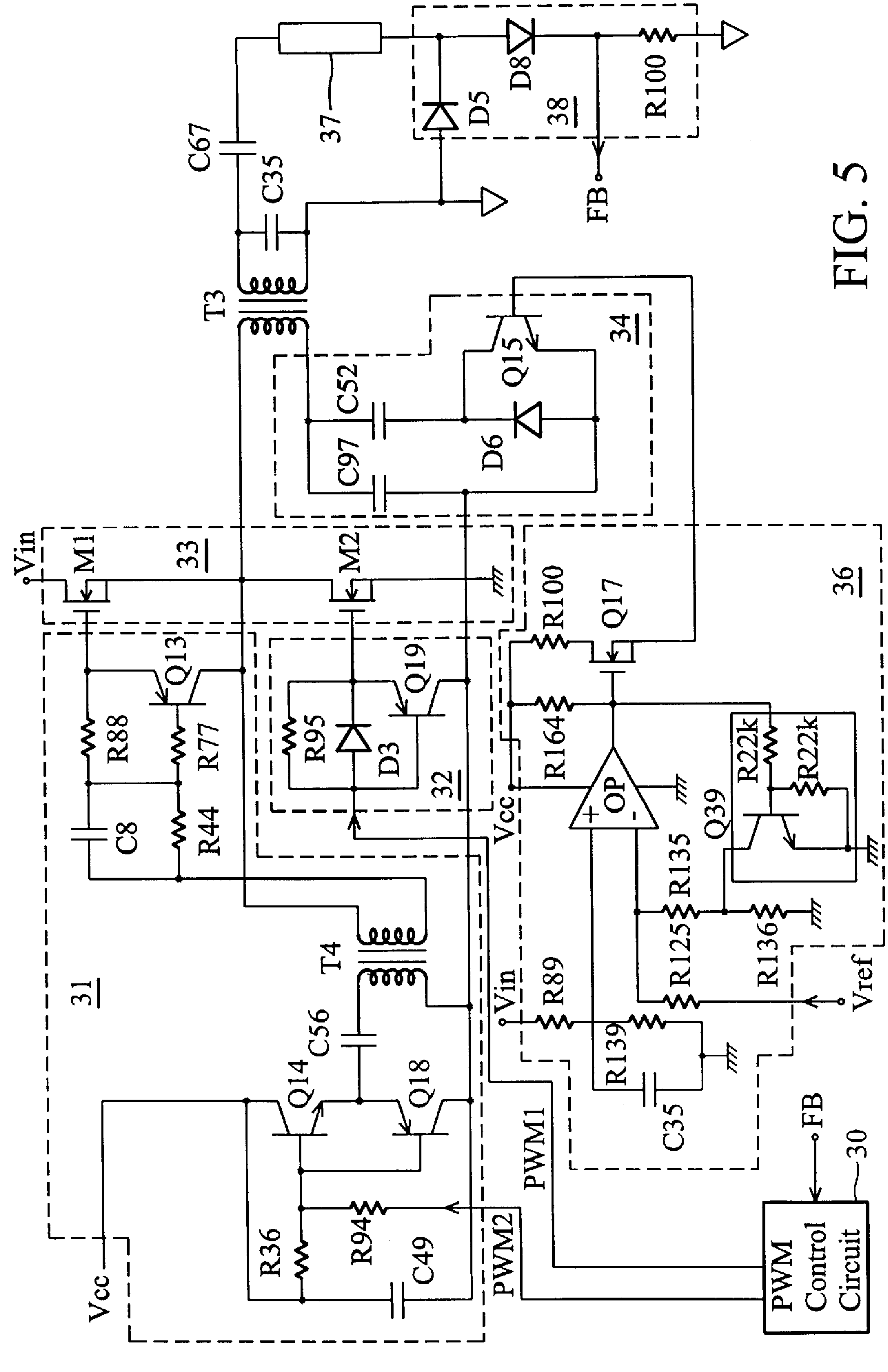
FIG. 5 is an embodiment of the circuit in FIG. 3 according to the invention.

FIG. 5 is an embodiment of the circuit in FIG. 3 according to the invention. In FIG. 5, the PWM control circuit 30 can be implemented by any known technique in the prior art. As shown in FIG. 5, in order to increase the driving ability of the signal PWM2, the switches Q14 and Q18 in the HSD 31 are implemented to be alternately turned on to produce a square-wave output. The square-wave signal provides a driving signal to the switch M1 after passing through a capacitor C56 and an isolating driving transformer T4. The switching speed of the switch M1, driven by the driving signal, can be increased via the circuit with a switch Q13, a resistor R44, a resistor R77, a resistor R88 and a capacitor C8. Similarly, switch Q19, resistor R95, and diode D3 in the LSD 32 can speed up the switching of switch M2. Switches 33 include the first and second switches M1 and M2, which are respectively driven by the HSD 31 and LSD 32. Switches M1 and M2 are alternately turned on with an operating frequency so as to convert the input DC voltage Vin into a square-wave output. The square-wave signal is input to the primary side of the transformer T3 and then stepped up and filtered by the transformer T3 to produce a sine-wave outputfor driving the lamp 37 coupled to the secondary side of the transformer T3. A capacitor C35 is connected in parallel with the secondary side of the transformer T3 to adjust the resonant curve. A capacitor C67 is connected in series with one end of the lamp 37 to reduce the influence of the LCD panel's characteristics. The feedback circuit 38 couples to the other end of the lamp 37. The feedback circuit 38, which is coupled to the other end of the lamp 37, includes a pair of diodes D5 and D8 for filtering the AC signal to produce a signal with only the positive sine-wave remaining and a sampling resistor R100 for sampling the current value through the lamp 37 and converting it into a voltage form as a feedback signal FB output to the PWM control circuit 30. The circuit 30 outputs the signals PWM2 and PWM1 according to the feedback signal FB to control the duty cycles of the HSD 31 and the LSD 32, respectively. Therefore, the lamp's brightness can be regulated.

The voltage detection circuit 36 has two input terminals, one for the input voltage Vin of the inverter, the other for a predetermined reference voltage Vref. The circuit 36 mainly includes a comparator OP, wherein the voltage Vin is fed into the non-inverted input terminal of the comparator OP and the voltage Vref is fed into the inverted input terminal.

The impedance adjustment circuit 34 mainly includes a first capacitor C97 and a second capacitor C52 connected in parallel, one of the connection point of the capacitors C97 and C52 connected to the primary side of the transformer and a control switch Q15 connected in series with the second capacitor C52. The control switch Q15 has a control input terminal coupled to the output of the voltage detection circuit 36. As such, when the voltage Vin is higher than the predetermined reference voltage Vref, the comparator OP will output a high voltage so that a switch Q17 connected to its output terminal is turned on and outputs a control signal to turn on the switch Q15 in the impedance adjustment circuit 34. In such a situation, the equivalent impedance of the circuit 34 is equal to the equivalent impedance of the parallelly-connected capacitors C97 and C52, which leads to the curve Z2 case as shown in FIG. 4. Conversely, when the voltage Vin is lower than the predetermined reference voltage Vref, the switch Q15 will not turn on. The equivalent impedance of the circuit 34 is equal to the equivalent impedance of the capacitor C97, which leads to the curve Z1 case as shown in FIG. 4. Accordingly, frequency-impedance curve switching is achieved so that the inverter is operated in a small varying bandwidth.

Preferably, the voltage detection circuit 36 also includes a hysteresis circuit mainly consisting of a switch Q39 and a resistor R22*k* to adjust the switching threshold of the control switch Q15. For example, in the case of the switching voltage designed in the external input AC voltage of the inventive power supply at 150 Vac, when the input voltage has a small change about 150 Vac, the switch Q15 may generate an error action. This can be solved by the hysteresis circuit. The reason is, for example, in a step-up situation, the hysteresis circuit shifting the threshold from 150 to 160 Vac so that the switch Q15 is turned on only at the voltage above 160 Vac. Also, in a step-down situation, the hysteresis circuit shifts the threshold from 150 to 140 Vac so that the switch Q15 is turned off only at voltage below 140 Vac.

Figure 6:
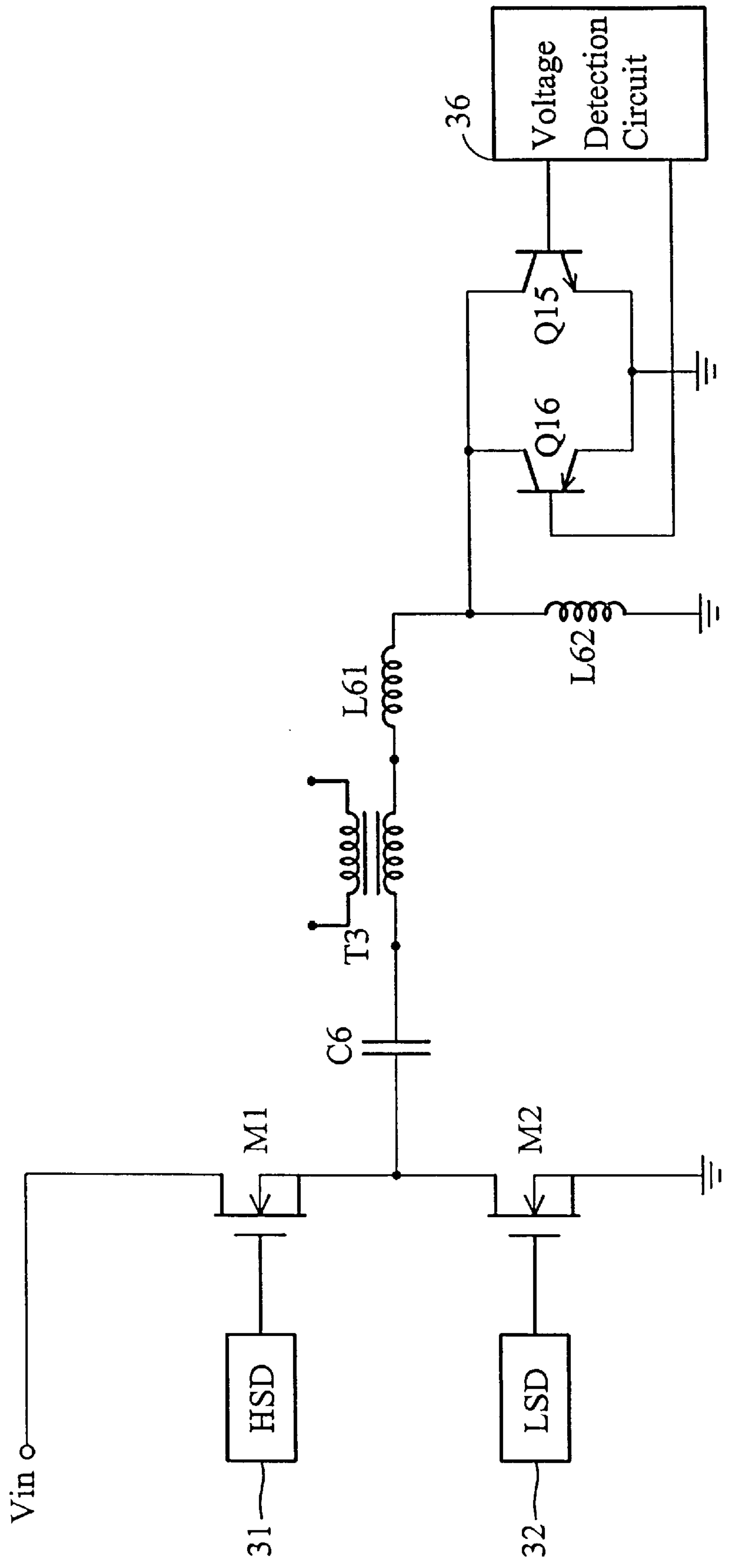
FIG. 6 is a second embodiment of the impedance adjustment circuit in FIG. 5.
Figure 7:
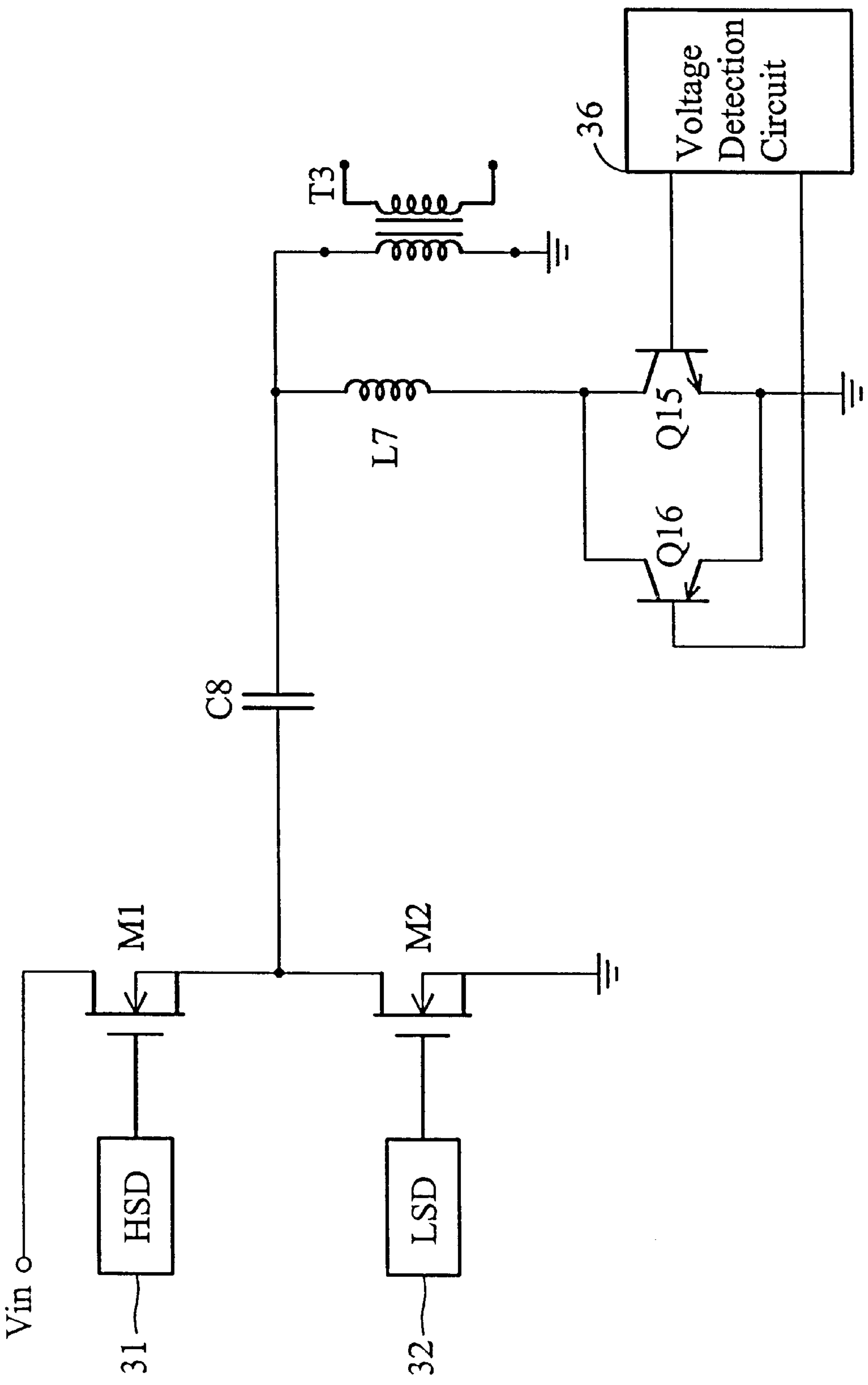
FIG. 7 is a third embodiment of the impedance adjustment circuit in FIG. 5.
Figure 8:
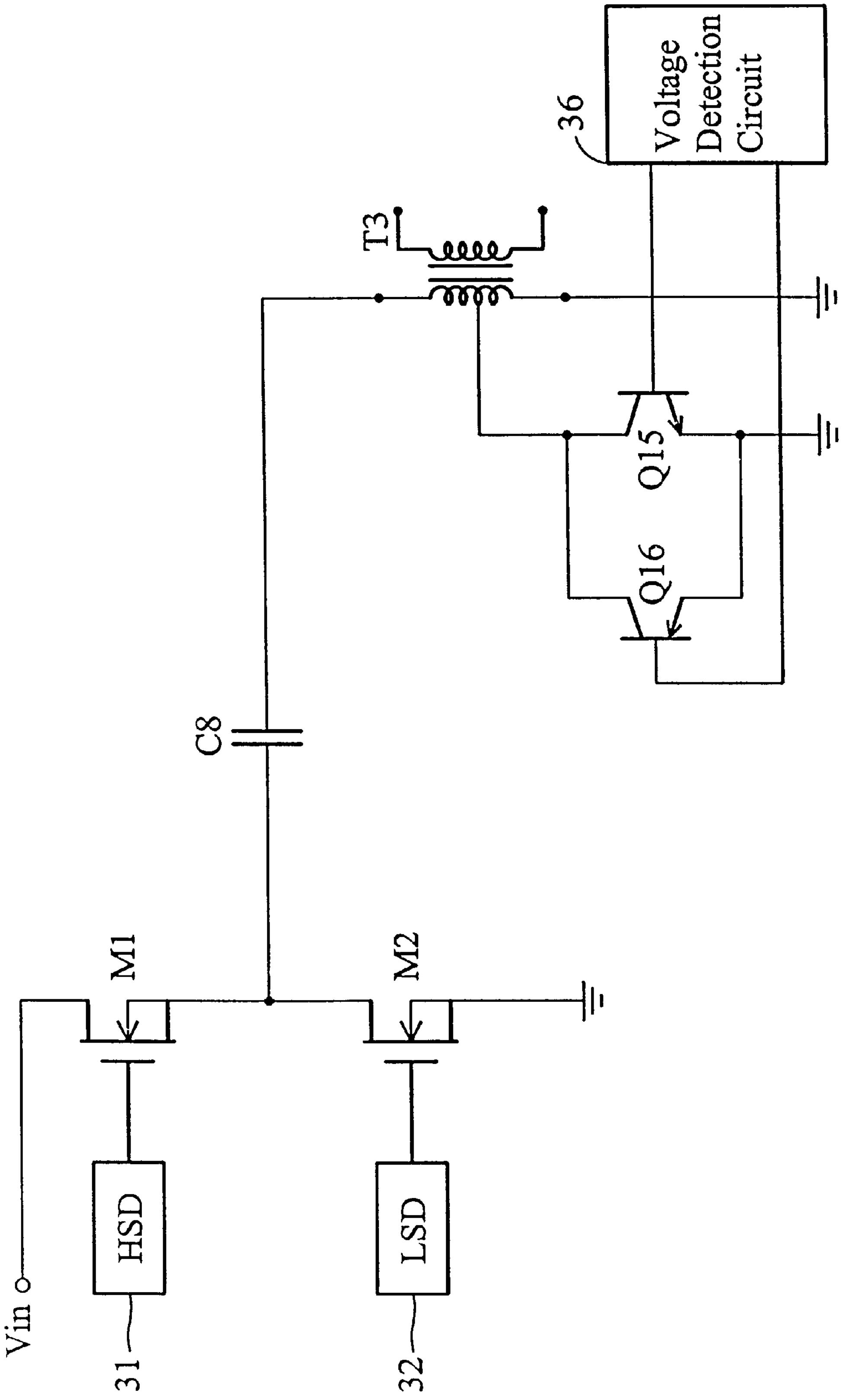
FIG. 8 is a fourth embodiment of the impedance adjustment circuit in FIG. 5.

The embodiment is only for illustration, and is not intended to be limiting, and other modification is allowable to those familiar with the prior art. For example, as shown in FIG. 6, the impedance adjustment circuit can be the series connection of first and second inductors L61 and L62. The second inductor L62 is connected in parallel with the control switch Q15. In addition, the series connection can be replaced by using an inductor L7 connected in parallel with the primary side of the transformer T3 and the inductor L7 is connected in series with the switch Q15, as shown in FIG. 7. Further, the switch Q15 can directly couple to the primary winding of the transformer T3 so as to change the equivalent impedance by changing the coil number of the primary side of the transformer T3 according to the on/off status of the switch Q15, as shown in FIG. 8.

In the preferred embodiment of FIG. 5, according to the invention, the switches 33 are provided in a half-bridge configuration, but the full-bridge and the push-pull configurations are also suitable for the invention. The switches M1 and M2 can be implemented by a MOS FET or any other type of transistor. Driving circuit 31 and 32 is only an example of explanation, and modification is adapted to meet the practical requirements. Further, the impedance adjustment circuit 34 can also be coupled to the secondary side of the transformer T3 even though it appears on the primary side of the transformer T3 in FIG. 5. That is, when the impedance adjustment circuit 34 is coupled between the capacitor C35 and the ground, the frequency-impedance curve switching effect is also achieved.

Although the invention has been described in its preferred embodiment, it is not intended to limit the invention to the precise embodiment disclosed herein. Those who are skilled in this technology can still make various alterations and modifications without departing from the scope and spirit of this invention. Therefore, the scope of the invention shall be defined and protected by the following claims and their equivalents.

What is claimed is:

1. A power supply for a system with a lamp, comprising:

a rectifier/filter, having an input terminal for connecting to an external alternating current (AC) power source so as to convert the input AC voltage into a direct current (DC) voltage, and an output terminal for outputting the DC voltage;

a DC-DC converter, connected to the output terminal of said rectifier/filter for reducing the DC voltage to a rated DC voltage output to power the system except for the lamp;

a DC-AC inverter, connected to the output terminal of said rectifier/filter for converting the DC voltage into an AC voltage output to power the lamp; and wherein said DC-AC inverter further comprises:

two switches, having a common output terminal and respectively having a control input terminal;

a driving circuit, electrically coupled to the respective control input terminals of the two switches, for alternatively turning on the two switches;

a transformer, having a primary side electrically coupled to the common output terminal of the two switches and a secondary side electrically coupled to the lamp;

a sampling circuit, electrically coupled to the lamp, for detecting the current value through the lamp and outputting a feedback signal;

a modulation control circuit, electrically coupled to the sampling circuit and the driving circuit, for controlling the driving circuit according to the feedback signal;

a voltage detection circuit with an input terminal, for outputting a control signal according to the voltage amplitude at the input terminal; and an impedance adjustment circuit, electrically coupled to the voltage detection circuit and the transformer, for adjusting the equivalent impedance value of the impedance adjustment circuit according to the control signal.

2. The power supply of claim 1, wherein the input terminal of the voltage detection circuit is electrically coupled to the output terminal of the rectifier/filter.

3. The power supply of claim 1, wherein the input terminal of the voltage detection circuit is electrically coupled to the external AC power source.

4. The power supply of claim 1, wherein the transformer is a step-up transformer.

5. The power supply of claim 1, wherein the operating frequency of the inverter is ranged between about 40 KHz and about 80 KHz.

6. The power supply of claim 1, wherein the impedance adjustment circuit is electrically coupled to the primary side of the transformer.

7. The power supply of claim 1, wherein the impedance adjustment circuit is electrically coupled to the secondary side of the transformer.

8. The power supply of claim 1, wherein the modulation control circuit is a pulse width modulation control circuit for controlling the duty cycle of the driving circuit according to the feedback signal.

9. The power supply of claim 1, wherein the modulation control circuit is a frequency modulation control circuit for controlling the switching frequency of the driving circuit according to the feedback signal.

10. An inverter for driving a discharge lamp, comprising:

two switches having two separately respective control input terminals and a common output terminal;

a driving circuit, electrically coupled to the two control input terminals of the switches, for alternatively turning on the two switches;

a transformer, having a primary side electrically coupled to the common output terminal of the switches and a secondary side electrically coupled to the lamp;

a sampling circuit; electrically coupled to the lamp, for detecting the current value through the lamp and outputting a feedback signal;

a modulation control circuit, electrically coupled to the sampling circuit and the driving circuit, for controlling the driving circuit according to the feedback signal; a voltage detection circuit with an input terminal, for outputting a control signal according to the voltage amplitude of the input terminal; and an impedance adjustment circuit, electrically coupled to the voltage detection circuit and the transformer, for adjusting the equivalent impedance value of the impedance adjustment circuit according to the control signal.

11. The inverter of claim 10, wherein the transformer is a step-up transformer.

12. The inverter of claim 10, wherein the operating frequency of the inverter is ranged between about 40 KHz and about 80 KHz.

13. The inverter of claim 10, wherein the impedance adjustment circuit is electrically coupled to the primary side of the transformer.

14. The inverter of claim 10, wherein the impedance adjustment circuit is electrically coupled to the secondary side of the transformer.

15. The inverter of claim 10, wherein the switches are metal oxide semiconductor field effect transistors.

16. The inverter of claim 10, wherein the impedance adjustment circuit comprises a control switch that has a control input terminal electrically coupled to the voltage detection circuit for adjusting the equivalent impedance of the impedance adjustment circuit by controlling the on/off status of the control switch according to the control signal.

17. The inverter of claim 10, wherein the modulation control circuit is a pulse width modulation control circuit for controlling the duty cycle of the driving circuit according to the feedback signal.

18. The inverter of claim 10, wherein the modulation control circuit is a frequency modulation control circuit for controlling the switching frequency of the driving circuit according to the feedback signal.

19. An inverter, for converting an input voltage to drive a discharge lamp, comprising:

two switch transistors, respectively having a control input terminal and having a common output terminal;

a driving circuit, electrically coupled to the respective control input terminals of the two switch transistors, for alternatively turning on the two switch transistors;

a transformer, having a primary side electrically coupled to the common output terminal of the two switch transistors and a secondary side electrically coupled to the lamp;

a sampling circuit, electrically coupled to the lamp, for detecting the current value through the lamp and outputting a feedback signal;

a modulation control circuit, electrically coupled to the sampling circuit and the driving circuit, for controlling the driving circuit according to the feedback signal to regulate the brightness of the lamp;

a voltage detection circuit having a comparator, the comparator having an input terminal electrically coupled to the input voltage of the inverter and another input terminal electrically coupled to a predetermined reference voltage so as to output a control signal according to the comparison result of the input voltage and the predetermined reference voltage; and an impedance adjustment circuit, having one side electrically coupled to the transformer and the other side electrically coupled to the voltage detection circuit via a control input terminal of a control switch, for adjusting the equivalent impedance of the impedance adjustment circuit by controlling the on/off status of the control switch according to the control signal.

20. The inverter of claim 19, wherein the impedance adjustment circuit is electrically coupled to the primary side of the transformer.

21. The inverter of claim 19, wherein the impedance adjustment circuit is electrically coupled to the secondary side of the transformer.

22. The inverter of claim 19, wherein the impedance adjustment circuit comprises a first capacitor connected in parallel with a second capacitor, one connection point of the first and second capacitors electrically coupled to the primary side of the transformer, the second capacitor connected in series with the control switch.

23. The inverter of claim 19, wherein the impedance adjustment circuit comprises a first inductor connected in series with a second inductor, one side of the first inductor electrically coupled to the primary side of the transformer, the second inductor connected in parallel with the control switch.

24. The inverter of claim 19, wherein the voltage detection circuit comprises a hysteresis circuit for controlling the switching threshold of the control switch.

25. The inverter of claim 19, wherein the impedance adjustment circuit comprises an inductor, one side of which is electrically coupled to the primary side of the transformer and the other side connected in series with the control switch.

26. The inverter of claim 19, wherein the control switch of the impedance adjustment circuit is coupled to one of the coils at the primary side of the transformer for changing the equivalent impedance by changing the coil number of the primary side of the transformer.

* * * * *